United States Patent [19]
Fuchigami

[11] Patent Number: 6,094,862
[45] Date of Patent: Aug. 1, 2000

[54] VACUUM RESERVOIR LIQUID DELIVERY APPARATUS

[76] Inventor: Leslie H. Fuchigami, 8252 NW. Oxbow Dr., Corvallis, Oreg. 97330

[21] Appl. No.: 09/105,473

[22] Filed: Jun. 26, 1998

Related U.S. Application Data

[60] Provisional application No. 60/051,033, Jun. 27, 1997.

[51] Int. Cl.[7] .................................................. A01G 27/06
[52] U.S. Cl. ............................................................. 47/81
[58] Field of Search ............................... 47/48.5, 79, 80, 47/81

[56] References Cited

U.S. PATENT DOCUMENTS

| | | | |
|---|---|---|---|
| 1,216,642 | 2/1917 | White | 47/81 |
| 1,342,786 | 6/1920 | White | 47/81 |
| 4,756,121 | 7/1988 | Wild | 47/80 |
| 4,885,870 | 12/1989 | Fong | 47/79 |
| 5,383,943 | 1/1995 | Ogawa et al. | 47/79 X |
| 5,581,937 | 12/1996 | Jenkins | 47/81 X |

FOREIGN PATENT DOCUMENTS

| | | | |
|---|---|---|---|
| 86745 | 6/1952 | Norway | 47/79 |
| 2233201 | 1/1991 | United Kingdom | 47/80 |

Primary Examiner—Michael J. Carone
Assistant Examiner—Jeffrey L. Gellner
Attorney, Agent, or Firm—Steven J. Adamson

[57] ABSTRACT

A plurality of systems and/or apparatuses for use in delivering liquid where desired, such as for watering agronomic or household plants. A reservoir housing is disclosed that has an egress opening and retains liquid by vacuum pressure. Capillary material is preferably provided at or near the egress opening for controlled delivery of liquid and to assist in establishing a regulatable seal at the egress opening. Several embodiments with both different and common components and features are disclosed.

11 Claims, 3 Drawing Sheets

6,094,862

VACUUM RESERVOIR LIQUID DELIVERY APPARATUS

CROSS REFERENCE TO RELATED APPLICATION(S)

This application claims the benefit of and is a continuation-in-part of U.S. Provisional Application Ser. No. 60/051,033, filed Jun. 27, 1997, and having the same title and inventor as above.

FIELD OF THE INVENTION

The present invention relates to a self watering system and more specifically to a self watering system that utilizes a reservoir maintained under vacuum pressure.

BACKGROUND OF THE INVENTION

Many prior art plant watering systems are known in the art and include both non-self watering and self watering systems. Non-self watering systems often rely on overhead sprinkling mechanisms or the periodic flooding of an open container in which plant pots are placed. These systems are disadvantageous, amongst other reasons, in that they tend to lose water through evaporation and create conditions of saturation or drought in the media with which they are used. In addition, simpler systems tend to require daily attention and maintenance while more advanced systems tend to be undesirably complex and expensive.

With respect to self watering systems, there are several known techniques for implementing such systems. They include systems that utilize capillary strips which descend into a reservoir under a potted plant and systems having reservoirs maintained under vacuum pressure that deliver water to adjacent potted plants, amongst others. The capillary strip systems are disadvantageous in that as the strips begin to clog or otherwise degrade, the capillary force becomes insufficient to extract water (against the force of gravity) from the reservoir. Furthermore, providing the reservoir under the plant pot may also result in inefficient pot design and difficulties in the delivery of replacement water.

The systems that maintain reservoirs under pressure tend to have difficulty regulating the amount of water delivered to an adjacent pot and are generally either undesirably complex or fragile. The complex systems include those that have many parts causing them to be expensive to produce and complicated to operate. Fragile systems include those that are highly susceptible to malfunction due to incorrect positioning and those that utilize components that are physically fragile.

SUMMARY OF THE INVENTION

Accordingly, it is an object of the present invention to provide an improved self regulating liquid delivery apparatus.

It is another object of the present invention to provide such a liquid delivery apparatus that is durable in design and relatively inexpensive in manufacture.

It is another object of the present invention to provide such a liquid delivery apparatus that efficiently delivers liquid.

It is also an object of the present invention to provide such a liquid delivery apparatus that utilizes a reservoir held under vacuum pressure and a capillary material for transport of liquid within the reservoir.

These and related objects of the present invention are achieved by use of the vacuum reservoir liquid delivery apparatus described herein. In one embodiment, the apparatus includes a reservoir housing configured to define a liquid egress opening therein and a capillary mat provided at the egress opening such that liquid in the reservoir flows through the egress opening to the capillary mat. When liquid from the reservoir housing saturates the capillary mat, liquid is retained within the reservoir housing by vacuum pressure. A cover that resealable mounts over the egress opening may also be provided. The capillary mat is positioned between the egress opening and the resealable cover.

The attainment of the foregoing and related advantages and features of the invention should be more readily apparent to those skilled in the art, after review of the following more detailed description of the invention taken together with the drawings.

DETAILED DESCRIPTION

Figure 1:
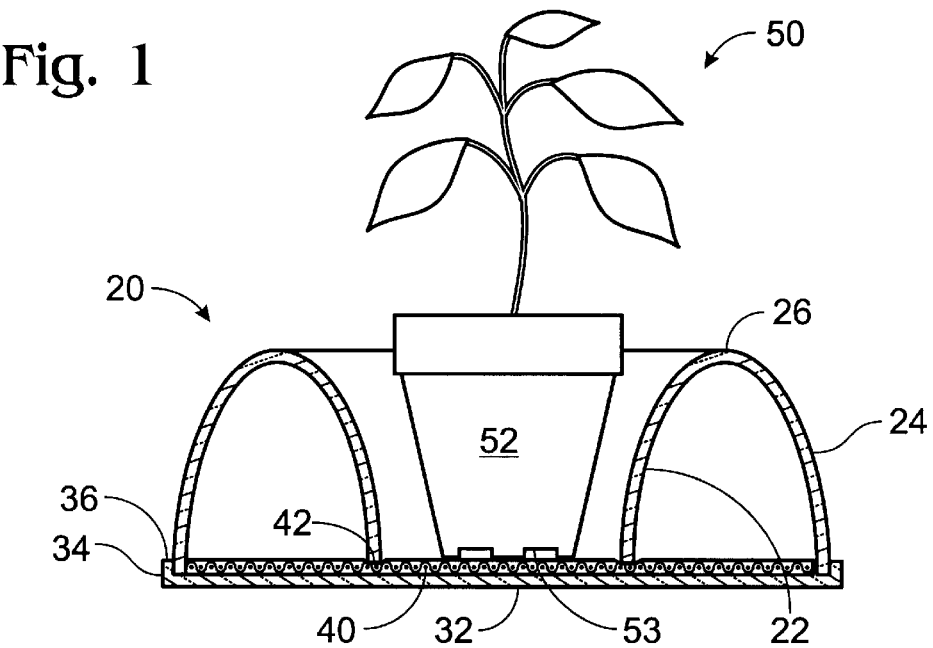
FIG. 1 is a cross-sectional side view of a watering system in accordance with the present invention.

Referring to FIG. 1, a cross-sectional side view of a watering system 10 in accordance with the present invention is shown. The system includes a reservoir housing comprised of a reservoir 20 and a reservoir bottom 30, and a capillary material 40 such as a capillary mat. Reservoir 20 is configured to have an inner wall 22 and an outer wall 24, which are joined by a top region 26. The top region may be broad or tapered, amongst other shapes. The volume defined by the inner wall, outer wall and top region is the volume of the reservoir.

Bottom 30 has a generally planar section 32 which matches the geometric pattern outlined by outer wall 26 and a lip 34 which extends upwardly along outer wall 26. The combination of lip 34, which is preferably slightly plastic, and the matching geometry of section 32 permits a seal 36 to be formed between bottom 30 and reservoir 20 such that no liquid leaks out.

Capillary mat 40 is provided between inner wall 22 and bottom 30 such that liquid in reservoir 20 can move through the capillary mat, under inner wall 22 and into a potted plant chamber 50. The relationship of mat 40 and outer wall 24 is not critical, though seal 36 should be maintained.

A potted plant 52 is placed inside chamber 50 such that the bottom of the pot and the soil media therein contacts mat 40. Holes 53 are provided in the bottom of pot 52 to permit uptake of liquid from mat 40. As the roots of a plant absorb moisture, moisture from soil media in the bottom of the pot replaces absorbed moisture. When the capillary mat is not saturated liquid flows out of the reservoir (as described below) and the spacing between the inner wall 22 and bottom 30 is effectively an egress opening for the liquid. Moisture is then drawn out of the capillary mat to replace that drawn from the soil media in the bottom of the pot.

When the capillary mat is saturated an airtight seal is fashioned between the inner wall 22 and bottom 30, termed the inner seal 42. When the capillary mat is not saturated liquid flows out of the reservoir (as described below) and the spacing between the inner wall 22 and bottom 30 is effectively an egress opening for liquid to exit the reservoir housing. As moisture is removed by the plant from the capillary mat, the moisture level is reduced at the inner seal 42 temporarily eliminating the condition of saturation at the seal. This then allows air to flow through the capillary mat at seal 42 into the interior of the reservoir. Movement of air into the reservoir displaces liquid therein which then flows by capillary action into the pores previously filled with air to re-establish a condition of saturation and an airtight inner seal. The airtight inner seal permits the formation and maintenance of vacuum conditions inside reservoir 20. Since the flow of liquid out of reservoir 20 is controlled by the uptake of water by a plant through transpiration (and to a more limited extent by evaporation) liquid is delivered to the plant in a very efficient, regulated manner.

With respect to the materials and methods of manufacture, the reservoir and bottom surface are preferably formed of plastic using standard injection molding techniques. The reservoir is preferably substantially rigid while the bottom is preferably pliable enough to snap about the reservoir outer wall and form a good seal. Injection molding is a preferred manner of manufacture, though it should be recognized that there are other forms of plastic manufacturing and other materials that may be used to form a reservoir and bottom as described herein. These other manufacturing methods and materials are contemplated by the inventor and are included in the present invention. It should also be recognized that the plastic or other material used to form the reservoir may be clear or translucent to permit the visual inspection of liquid level within the reservoir.

The capillary mat is preferably made of polypropylene, though other materials such as cotton and other "wicking" materials may be suitable. These materials are characterized in that they are hydrophilic (and/or made hydrophilic by treatment with surfactants) and are generally resistant to common sources of environmental degradation. The capillary mat material may also contains antibiotic and antifungal compounds. Such compounds and their application are known in the art.

Figure 2:
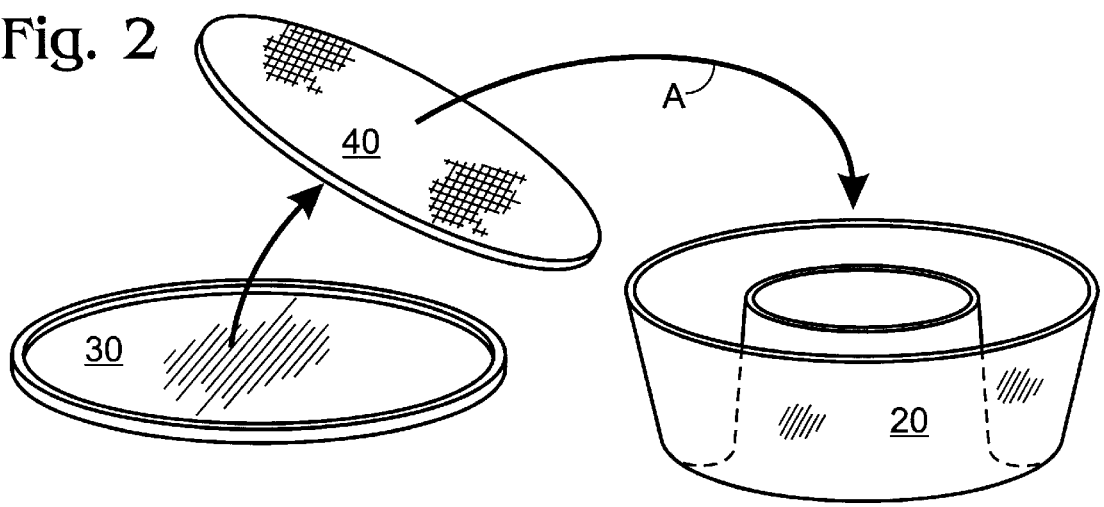
FIG. 2 is a perspective view of the manner in which watering system of FIG. 1 is assembled in accordance with the present invention.

Referring to FIG. 2, a perspective view of the manner in which watering system 10 of FIG. 1 is assembled in accordance with the present invention is shown. Reservoir 20 is placed upside down and liquid is poured in. The capillary mat is then placed over the reservoir or inside bottom 30, and bottom 30 is flipped in the direction of arrow A onto reservoir 20. Pressure is then exerted on bottom 30 until lip 34 securely seals around with outer wall 26 to form seal 36.

The reservoir and bottom are then flipped right side up (as shown on FIG. 1) so that a potted plant may be inserted in chamber 50.

Figure 3:
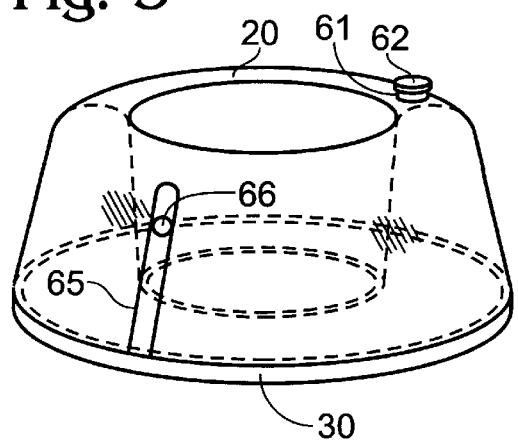
FIG. 3 is a perspective view of the watering system of FIG. 1 illustrating additional features in accordance with the present invention.

Referring to FIG. 3, a perspective view of the watering system of FIG. 1 illustrating additional features in accordance with the present invention is shown. The embodiment of FIG. 3 illustrates an external fill orifice 61 and a cap 62 therefor. Absent vacuum inside reservoir 20, liquid therein would escape through inner seal 42 and fill chamber 50 to the same level as the liquid in the reservoir. When cap 62 is removed the vacuum condition is eliminated. To prevent unwanted flow into chamber 50 an operator can exert pressure on the top of the reservoir, for example, by placing a hand on the reservoir and forcing inner wall 24 downward toward bottom 30 to retard the flow of liquid through inner seal 42. The operator may then remove cap 62, fill the reservoir and replace cap 62 to restore the vacuum. This implementation permits filling reservoir 20 without turning the reservoir upside down and removing the bottom.

FIG. 3 also illustrates the inclusion of a water level monitoring device 56. This device may take many forms. For example, it may take the form of a section of clear or translucent plastic vertically arranged in the wall of reservoir 20 or a tube of clear or translucent plastic mounted externally to the reservoir but connected at the top and bottom, amongst other configurations. A floating bobber 58 may be added to enhance visibility of water level.

Figure 4:
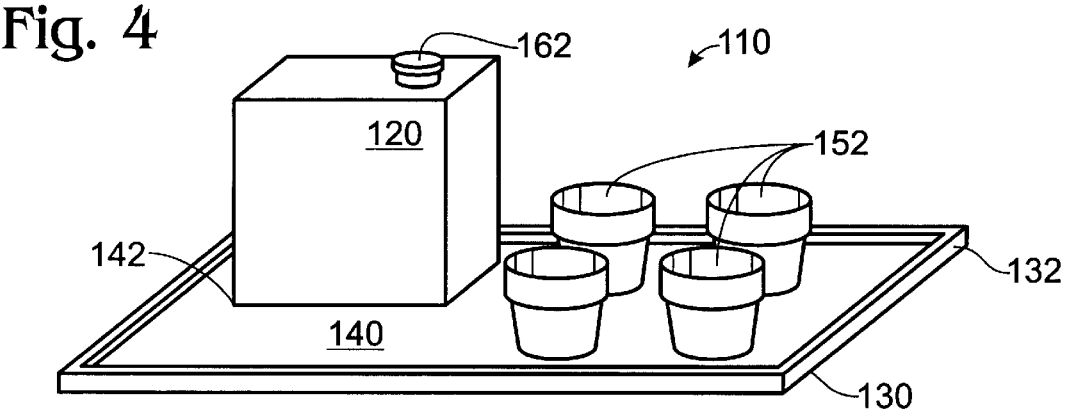
FIG. 4 is a perspective view of another embodiment of a vacuum reservoir watering system in accordance with the present invention.

Referring to FIG. 4, a perspective view of another embodiment of a vacuum reservoir watering system 110 in accordance with the present invention is shown. This system includes a reservoir 120 having an opening (not shown) formed in the bottom thereof that is placed on top of a capillary mat 140 which is positioned in a tray type bottom 130 that is impervious to water or like liquids. Examples of bottom 130 include, but are not limited to, a tray (as shown), sheeting of plastic or like material or a stainless steel table top, etc. The principles of operation of system 110 are the same as disclosed above for system 10. As plants in pots 152 take up water, replacement water is pulled through capillary mat 140 from reservoir 120. An inner seal 142 is formed between reservoir 120 and bottom 130 when the interlying region of capillary mat 140 is saturated. Bottom 130 may include walls 132 for containment of liquid overflows, though under normal operating conditions liquid is maintained substantially in capillary mat 140. A fill opening for reservoir 120 may be located on a top thereof and covered by a resealable cap 162 or provided on the bottom thereof as discussed in more detail below with reference to FIG. 5B. It should also be recognized that if reservoir 120 is sufficiently large, then small support legs or footings should be formed on the bottom thereof so that capillary mat 140 is not compressed to the point where air is prevented from moving through the capillary mat and into the reservoir to reduce vacuum pressure therein.

Figure 5A:
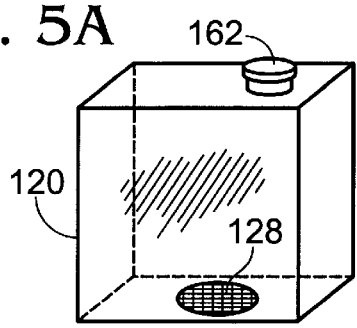
FIG. 5A is a perspective view of a reservoir illustrating an embodiment of a feed opening in accordance with the present invention.

Referring to FIG. 5A, a perspective view of reservoir 120 illustrating an embodiment of a feed opening 128 in accordance with the present invention is shown. Opening 128 may consist of a plurality of holes drilled in the bottom of a reservoir 120 or a larger opening over which a fine mesh or screen is placed. Opening 128 is preferably configured such that the surface tension of water molecules at opening 128 is sufficient in combination with the vacuum force created inside reservoir 120 to substantially retain liquid in reservoir 120 when the reservoir is lifted off capillary mat 140.

Figure 5B:
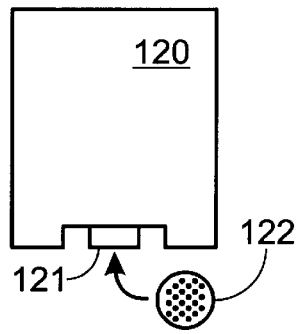
FIG. 5B is a partial cross-sectional side view of another embodiment of a reservoir in accordance with the present invention.

Referring to FIG. 5B, a partial cross-sectional side view of another embodiment of a reservoir 120 in accordance with the present invention is shown. Reservoir 120 of FIG. 5B is configured such that a fill opening 121 is configured on the bottom surface thereof. A cap 122 having holes or the like to create opening 128 is resealably secured to the collar of opening 121. Cap 122 may be a screw-on or snap-on cap or the like. The reservoir of FIG. 5B is preferably configured such that cap 122 when mounted is substantially flush with the bottom of the reservoir such that a good seal is obtained between cap 122 and capillary mat 140.

Reservoir 120 of FIG. 5B may be used by turning opening 121 up, removing cap 122, filling the reservoir, replacing the cap, turning the reservoir such that the cap is down again, and placing the reservoir on the capillary mat.

The provision of substantially only one opening for ingress and egress of liquid reduces the risk of loss of vacuum pressure within reservoir 120, for example, due to an incorrect seal of cap 162 of FIGS. 4 and 5A.

Figure 6:
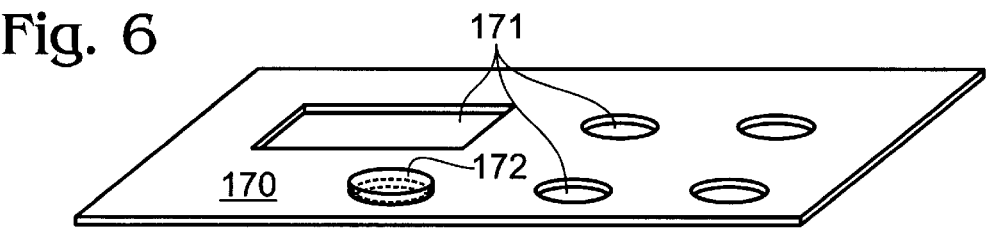
FIG. 6 is a perspective view of a cover plate for use with the system of FIG. 4 in accordance with the present invention.

Referring to FIG. 6, a perspective view of a cover plate (or sheet) 170 for use with the system of FIG. 4 in accordance with the present invention is shown. Plate 170 is preferably configured to have at least the approximate planar dimensions of capillary mat 140 with openings 171 configured therein through which reservoir 120 and pots 152 are placed. Plugs or covers 172 can be provided in each unused opening. Plate 170 is placed over capillary mat 140, for example, in contact which the top of walls 132 or directly on the capillary mat and overlapping the borders of the capillary mat. Reservoir 120 and pots 152 are inserted through available openings. Unused openings are covered.

Plate 170 may be formed from a substantially rigid material or be provided as a flexible sheet of plastic or the like (or as a thin mesh designed to reduce evaporation) placed over or formed integrally with capillary mat 140. Plate 170 in rigid or flexible form may contain UV inhibitors. The plate may also take the form of a plastic bag or envelope placed around the capillary mat in which openings are cut on the top surface to accommodate the reservoir and potted plant bottoms.

The provision of plate 170 eliminates or significantly reduces extraneous evaporation of water from capillary mat 140. Accordingly, with the use of plate 170 and plugs 172, water in reservoir 120 is efficiently delivered to plants in pots 152 and evaporation loss is minimized, leading to significantly increased time periods between refill and significant reductions in the amount of water required to water the plants.

Figure 7:
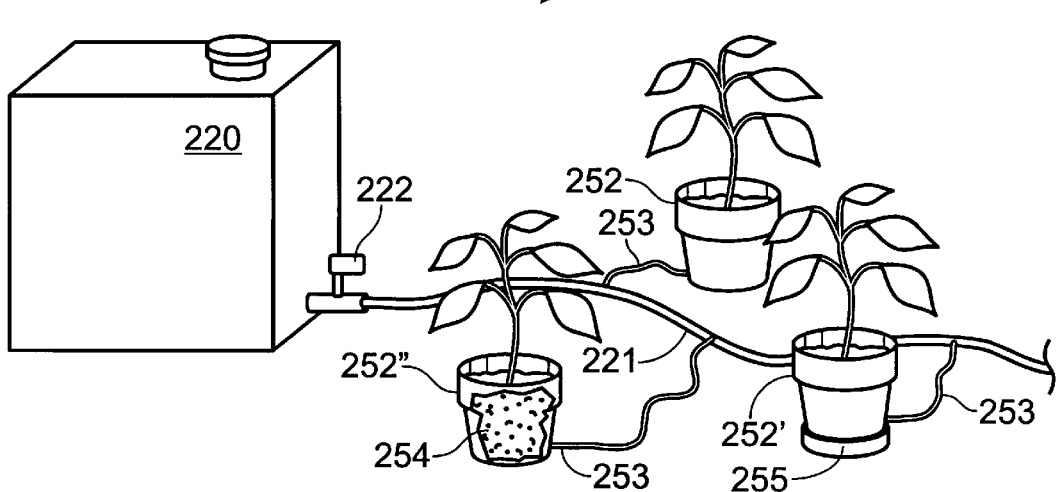
FIG. 7 is a perspective view of another embodiment of a vacuum reservoir watering system in accordance with the present invention.

Referring to FIG. 7, a perspective view of another embodiment of a vacuum reservoir watering system 210 in accordance with the present invention is shown. An extension tube 221 extends from reservoir 220 and thereby effectively enlarges the size and shape of reservoir 220. A shut-off valve 222 may be provided between reservoir 220 and tube 221. A plurality of sub-tubes 253 connect tube 221 to a plurality of plant pots 252,252',252". The plant pots may contain a capillary mat 255 coupled to the outlet of a sub-tube as in pot 252' or a growing media 254 that approximates a capillary mat in consistency 252".

The operation of system 220 is substantially the same as described above for systems 10 and 110 above. When the capillary mat 255 or planting media 254 is saturated, no air flows into the sub-tubes 253 and into reservoir 220. As a result, liquid in reservoir 220 is retained by vacuum pressure. As the capillary mat or planting media dries out, air is permitted to enter sub-tubes 253 and hence reservoir 220 releases liquid which again saturates the mat or media. It should be recognized that the tube and sub-tubes have to be of sufficient diameter such that vacuum pressure and surface tension do not prevent the flow of liquid therethrough. Alternatively, a capillary fiber can be provided within the tubes (and sub-tubes) to overcome this problem.

Supply reservoir 220 may be filled by any known means including, but not limited to, external fill openings such as those shown in FIGS. 4 and 5A and automated refill devices utilizing conduits connected to a permanent liquid supply and liquid level dependent control valves therefor.

Figure 8:
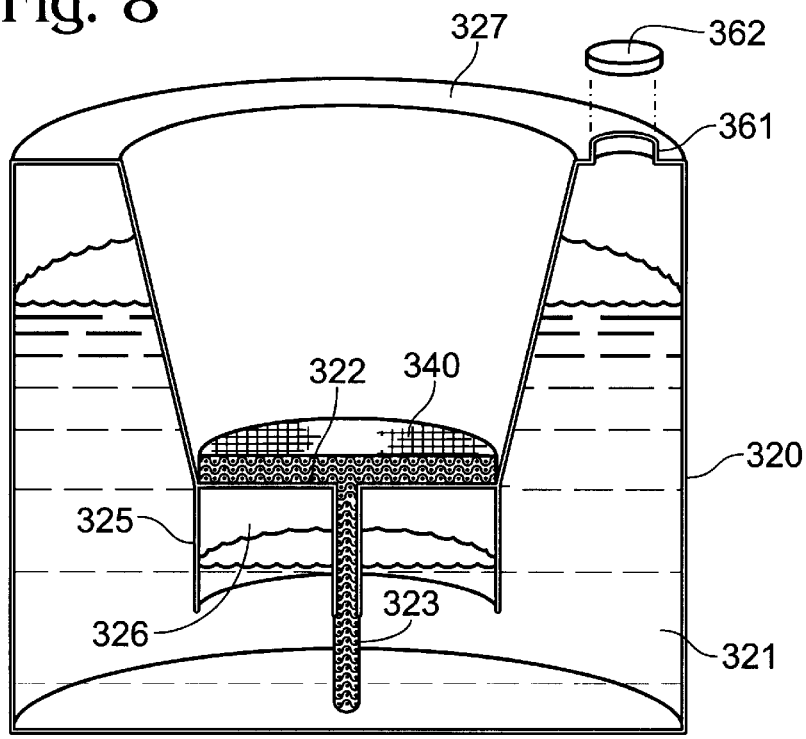
FIG. 8 is a cross sectional view of another liquid delivering apparatus in accordance with the present invention.

Referring to FIG. 8, a cross sectional view of another liquid delivery apparatus in accordance with the present invention is shown. The apparatus includes a reservoir housing 320 that defines a volume 321. A tube 323 or the like is preferably coupled to the surface 322 of the housing on which a potted plant would be placed and effectively creates an egress opening from liquid flow out of the reservoir housing. Capillary material 340 is preferably provided on surface 322 and through tube 323 towards the bottom of the reservoir housing. An extender wall 325 is preferably provided circumferentially about tube 323, and a fill opening 361 and resealable cover 362 are provided generally on a top surface 327 of the reservoir housing.

In use, the reservoir is filled through opening 361. The capillary material 340 and volume 326 created by extender 325 help to retard or impede the flow of liquid through tube 323 when cap 326 is not secured (e.g., during filling) and vacuum pressure conditions are not present within reservoir housing 320. The capillary material functions in this capacity by providing physical blockage within the tube. Volume 326 functions by providing a compressible air space that liquid filling reservoir housing 320 can expand into, instead of moving through tube 323. This reduces the pressure exerted by the filling liquid at tube 323. Eventually as the air space of tube 326 is compacted, liquid pressure increases at tube 323. The delay before this occurs, however, gives a user more time to fill the reservoir and reseal cap 362.

Figure 9:
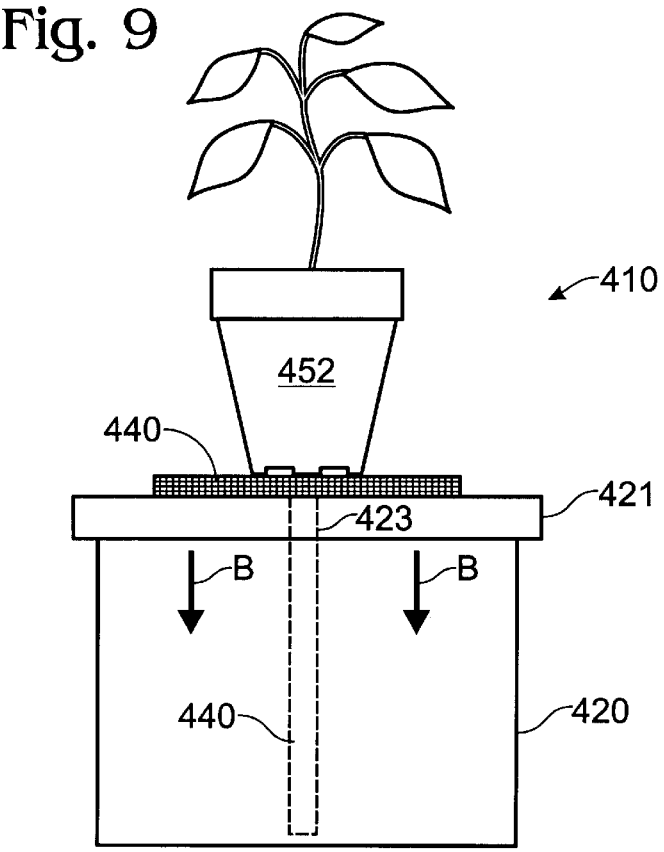
FIG. 9 is a cross sectional view of another liquid delivery apparatus in accordance with the present invention.

Referring to FIG. 9, a cross sectional view of another liquid delivery apparatus in accordance with the present invention is shown. FIG. 9 illustrates an apparatus 410 having a reservoir housing 420 including a cover 421 that is attached to the remainder of the housing by mounting it in the direction of arrows B. A tube 423 or like opening is provided through cover 421 and capillary material 440 is provided on cover 421 and through tube 423. The capillary material 440 functions in the manner described above for capillary material 340 of FIG. 8. An airtight seal is preferably provided between cover 421 and the remainder of the reservoir housing such that in the event that the apparatus is knocked over, vacuum pressure within the reservoir housing stops or significantly impedes liquid flow therefrom.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. A liquid delivery apparatus, comprising:
 a reservoir housing configured to define a reservoir volume, a resealable ingress opening and a plant pot receiving surface member that is provided below at least a portion of said reservoir volume;

a liquid egress opening defined in said surface member;

a conduit member substantially aligned with said egress opening that descends from said surface member and defines a substantially vertical conduit;

a compressible air volume defining member that is provided substantially perpendicular to said surface member and disposed generally about said conduit member so as to define an air volume bordered at least in part by said conduit member and said defining member, said air volume forming a compressible air volume when liquid fills said reservoir up to the level where that liquid touches the bottom portions of said conduit member and defining member, said compressible volume serving to lessen the pressure of fill liquid at said egress;

wherein said conduit member and said defining member are formed integrally with said surface member.

2. The apparatus of claim 1, wherein said surface member is disposed substantially horizontally in use.

3. The apparatus of claim 1, wherein said compressible air volume is substantially airtight.

4. The apparatus of claim 1, further comprising capillary material provided within said conduit member.

5. The apparatus of claim 4, wherein said capillary material extends from said surface member through said egress and said conduit member to a location proximate the bottom interior surface of said reservoir volume.

6. A liquid delivery apparatus, comprising:

a reservoir housing configured to define a reservoir volume, a resealable ingress opening and a plant pot receiving surface member that is provided below at least a portion of said reservoir volume;

a liquid egress opening defined in said surface member;

a conduit member substantially aligned with said egress opening that descends from said surface member and defines a substantially vertical conduit;

a compressible air volume defining member that is provided substantially perpendicular to said surface member and disposed generally about said conduit member so as to define an air volume bordered at least in part by said conduit member and said defining member, said air volume forming a compressible air volume when liquid fills said reservoir up to the level where that liquid touches the bottom portions of said conduit member and defining member, said compressible volume serving to lessen the pressure of fill liquid at said egress; and wherein said reservoir housing is configured to provide an interior wall that is generally conical in shape and is coupled at a bottom thereof to said surface member.

7. The apparatus of claim 6 further comprising capillary material within said conduit member.

8. A liquid delivery apparatus, comprising:

a reservoir housing configured to define a reservoir volume, a resealable fill opening and a plant pot receiving surface member that is provided below at least a portion of said reservoir volume and disposed substantially horizontally in use;

a liquid egress opening defined in said surface member;

a conduit member substantially aligned with said egress opening that descends from said surface member and defines a substantially vertical conduit;

a compressible air volume defining member that is provided substantially perpendicular to said surface member and disposed generally about said conduit member so as to define a substantially airtight air volume bordered at least in part by said conduit member and said defining member, said air volume forming a compressible air volume when liquid fills said reservoir up to the level where that liquid touches the bottom portions of said conduit member and defining member, said compressible air volume serving to lessen the pressure of fill liquid at said egress; and capillary material that extends from said surface member through said egress and said conduit member to a location proximate the bottom interior surface of said reservoir volume.

9. The apparatus of claim 8, wherein said conduit member and said defining member are formed integrally with said surface member.

10. The apparatus of claim 8, wherein said reservoir housing is configured to provide an interior wall that is generally conical in shape and is coupled at a bottom thereof to said surface member.

11. A liquid delivery apparatus, comprising:

a reservoir housing configured to define a reservoir volume, a resealable liquid ingress opening, a liquid egress opening and a plant pot receiving surface member that is provided below at least a portion of said reservoir volume and disposed substantially horizontally in use, said liquid egress opening being provided in said surface member;

a compressible air volume defining member that is disposed substantially vertically below said surface member and that forms in cooperation with said surface member a compressible air volume when liquid fills said reservoir up to the level where that liquid touches the bottom portions of said defining member, said compressible air volume being formed substantially proximate said egress opening and serving to lessen the pressure of fill liquid at said egress opening; and capillary material that extends from said surface member through said egress to a location proximate the bottom interior surface of said reservoir volume.

* * * * *